(12) United States Patent
Tan

(10) Patent No.: US 12,296,704 B2
(45) Date of Patent: May 13, 2025

(54) ELECTRIC VEHICLE WIRELESS CHARGING SYSTEM AND METHOD

(71) Applicant: Wenye Tan, Arlington, VA (US)

(72) Inventor: Wenye Tan, Arlington, VA (US)

( * ) Notice: Subject to any disclaimer, the term of this patent is extended or adjusted under 35 U.S.C. 154(b) by 1026 days.

(21) Appl. No.: 17/308,037

(22) Filed: May 4, 2021

(65) Prior Publication Data

US 2022/0355691 A1    Nov. 10, 2022

(51) Int. Cl.
*B60L 53/37* (2019.01)
*B60L 53/12* (2019.01)
*B60L 53/126* (2019.01)
*B60L 53/38* (2019.01)

(52) U.S. Cl.
CPC .............. *B60L 53/37* (2019.02); *B60L 53/12* (2019.02); *B60L 53/126* (2019.02); *B60L 53/38* (2019.02); *B60L 2250/16* (2013.01)

(58) Field of Classification Search
CPC ........ B60L 53/37; B60L 53/12; B60L 53/126; B60L 53/38; B60L 2250/16
See application file for complete search history.

(56) References Cited

U.S. PATENT DOCUMENTS

| | | |
|---|---|---|
| 10,486,541 B2 | 11/2019 | Littrell |
| 10,906,421 B2 | 2/2021 | Wu |
| 2011/0175569 A1* | 7/2011 | Austin ................... B60L 53/68 320/109 |
| 2014/0021908 A1* | 1/2014 | McCool .................. H02J 50/12 320/108 |
| 2018/0069431 A1* | 3/2018 | Mastrandrea .......... B60L 53/36 |
| 2018/0207520 A1* | 7/2018 | Kadota ................... H02J 50/80 |
| 2020/0094700 A1* | 3/2020 | Hui ........................ B60L 53/60 |
| 2020/0247425 A1 | 8/2020 | Espin et al. |
| 2020/0295576 A1 | 9/2020 | Kemppainen et al. |

\* cited by examiner

*Primary Examiner* — David V Henze-Gongola

(57) ABSTRACT

An electric vehicle charging method includes obtaining charging information about a wireless charging station including at least one charging pad for wirelessly transmitting power to at least one charge receiving pad of the electric vehicle; establishing a charging position between the at least one charging pad and the at least one charge receiving pad; and displaying on a display screen the at least one charging pad overlapped by a virtual charge receiving pad representing the at least one charge receiving pad. The method also includes determining whether the charging position is desired to start a wireless charging session between the charging station and the electric vehicle; prompting a readiness for charging on the display screen after determining that the charging position is desired to start the wireless charging session; and starting the wireless charging session between the electric vehicle and the wireless charging station.

20 Claims, 19 Drawing Sheets

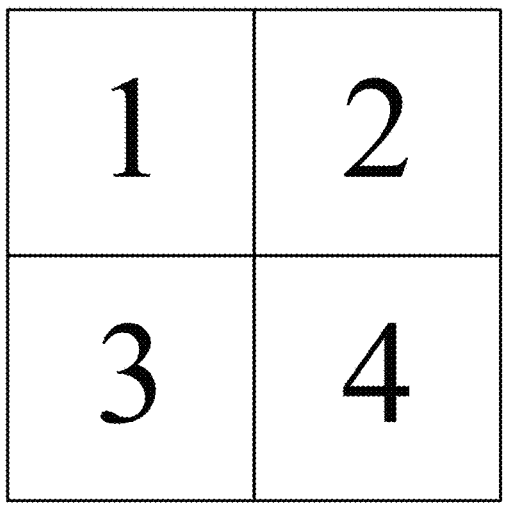

- Charging Pad 1 -
Charging network: xyz
Power source: Ordinary
Charging rate: super fast
Charging price: $a/w

- Charging Pad 2 -
Charging network: uvw
Power source: Solar
Charging rate: normal
Charging price: $b/w

- Charging Pad 3 -
Charging network: opq
Power source: Wind
Charging rate: fast
Charging price: $c/w

- Charging Pad 4 -
Charging network: rst
Power source: Renewable
Charging rate: multiple
Charging price: $d/w

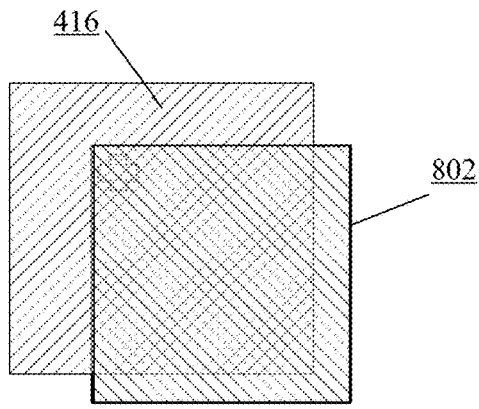
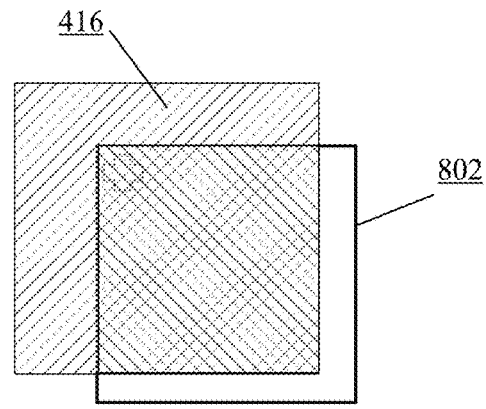
FIG. 10A                FIG. 10B
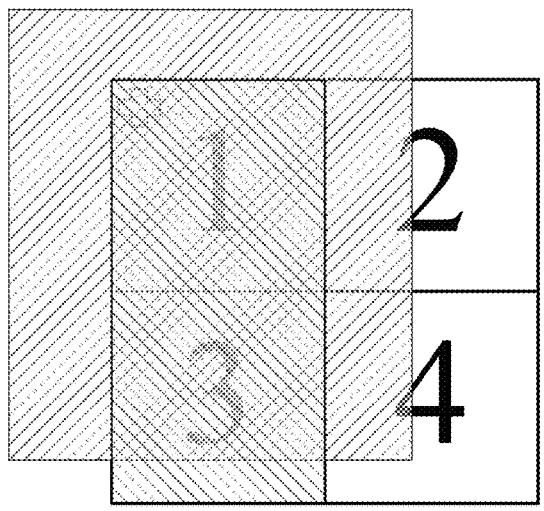
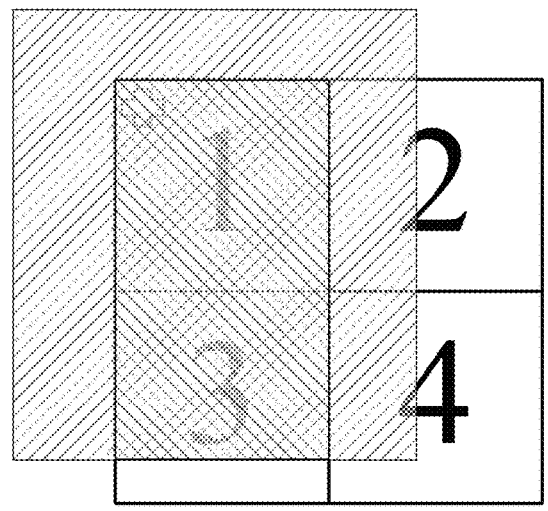
FIG. 10C                FIG. 10D

ELECTRIC VEHICLE WIRELESS CHARGING SYSTEM AND METHOD

FIELD OF THE INVENTION

The present disclosure relates to electric vehicle charging technologies and, more particularly, to an electric vehicle wireless charging system and method.

BACKGROUND

Currently, electric vehicle technologies are advancing rapidly. However, when more and more people are getting electric vehicles (EVs), the EV charging infrastructure and systems are still insufficiently meeting the increasing demands with respect to the convenience, purchase choices, and user interfaces, etc. As many EV companies and EV charging network companies rush to deploy their own technologies, a more integrated and systematic approach on charging EVs is needed to improve vehicle charging efficiency, and the convenience and user experience of EV owners. The disclosed method and system are directed to solve one or more problems set forth above and other problems.

BRIEF SUMMARY OF THE DISCLOSURE

One aspect of the present disclosure provides a method for wirelessly charging an electric vehicle. The method includes obtaining charging information about a wireless charging station including at least one charging pad for wirelessly transmitting power to at least one charge receiving pad of the electric vehicle; establishing a charging position between the at least one charging pad and the at least one charge receiving pad; and displaying on a display screen the at least one charging pad overlapped by a virtual charge receiving pad representing the at least one charge receiving pad. The method also includes determining whether the charging position is desired to start a wireless charging session between the charging station and the electric vehicle; prompting a readiness for charging on the display screen after determining that the charging position is desired to start the wireless charging session; and starting the wireless charging session between the electric vehicle and the wireless charging station.

Another aspect of the present disclosure provides an electronic device. The electronic device includes a camera, a memory storing computer program instructions, and a processor coupled to the memory. When executing the computer program instructions, the processor is configured to perform: obtaining charging information about a wireless charging station including at least one charging pad for wirelessly transmitting power to at least one charge receiving pad of an electric vehicle; establishing a charging position between the at least one charging pad of the wireless charging station and the at least one charge receiving pad of the electric vehicle; displaying on a display screen the at least one charging pad overlapped by a virtual charge receiving pad representing the at least one charge receiving pad of the electric vehicle; determining whether the charging position is desired to start a wireless charging session between the charging station and the electric vehicle; after determining that the charging position is desired to start the wireless charging session, prompting a readiness for charging on the display screen; and starting the wireless charging session between the electric vehicle and the wireless charging station.

Another aspect of the present disclosure provides an electric vehicle. The electric vehicle includes a vehicle body, a motor housed by the vehicle body, a battery for providing power to the motor, a vehicle charging system for wireless charging the battery from a wireless charging station and including at least one charge receiving pad, a display screen, and a controller to control the vehicle charging system to perform: obtaining charging information about the wireless charging station, the wireless charging station including at least one charging pad for wirelessly transmitting power to the at least one charge receiving pad; establishing a charging position between the at least one charging pad of the wireless charging station and the at least one charge receiving pad; displaying on the display screen the at least one charging pad overlapped by a virtual charge receiving pad representing the at least one charge receiving pad of the electric vehicle; determining whether the charging position is desired to start a wireless charging session between the charging station and the electric vehicle; after determining that the charging position is desired to start the wireless charging session, prompting a readiness for charging on the display screen; and starting the wireless charging session between the electric vehicle and the wireless charging station.

Other aspects of the present disclosure can be understood by those skilled in the art in light of the description, the claims, and the drawings of the present disclosure.

BRIEF DESCRIPTION OF THE DRAWINGS

FIGS. 7A-7B illustrate certain exemplary charging station information displays consistent with the disclosed embodiments;

FIGS. 10A-10D illustrate certain prompting displays consistent with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. Further, the described embodiments are some but not all of the embodiments of the present invention. Based on the disclosed embodiments, persons of ordinary skill in the art may derive other embodiments consistent with the present disclosure, all of which are within the scope of the present invention.

Figure 1:
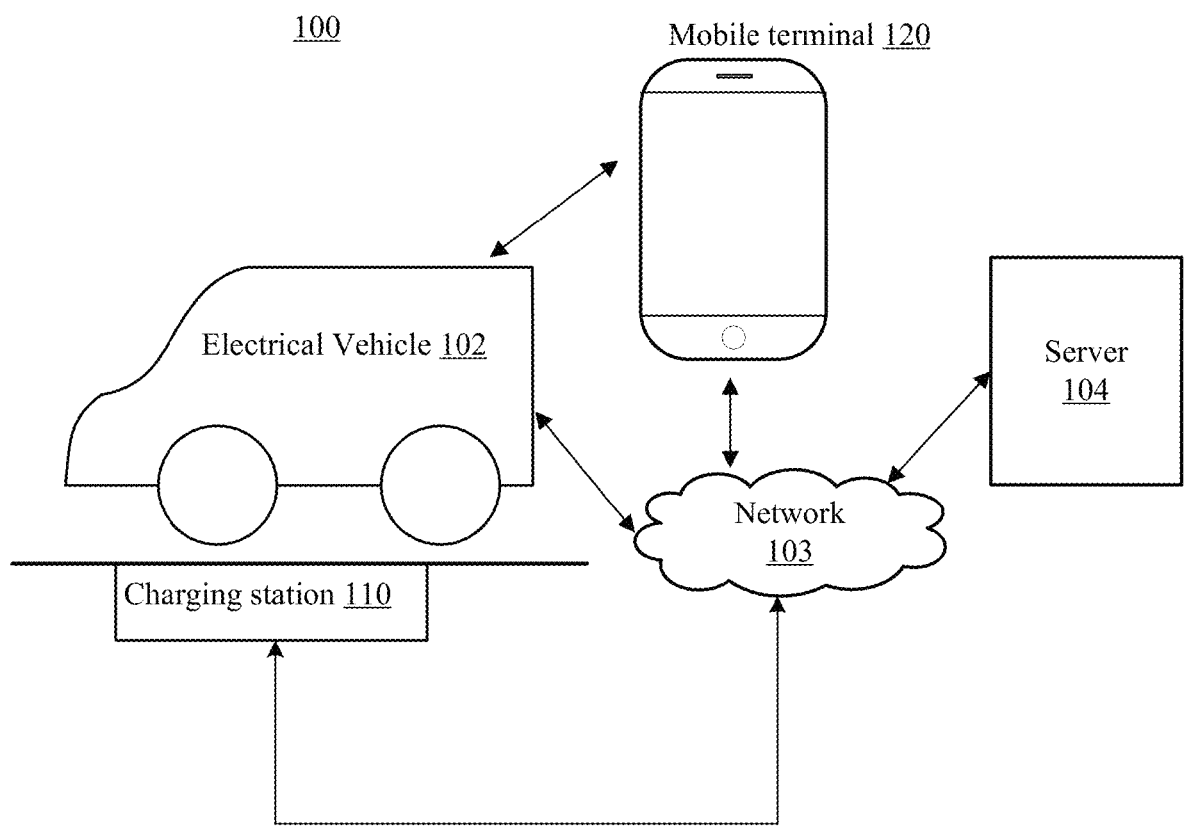
FIG. 1 illustrates an exemplary online EV wireless charging environment incorporating certain disclosed embodiments.

Electric vehicles (EV's) are vehicles powered by onboard batteries. Generally, EVs are configured to charge the onboard batteries through a power supply, such as a wired power supply or a wireless power supply. Various charging stations for providing wired and wireless power either alternately or simultaneously to EVs can be deployed to give owners of the EVs access to power supplies to charge the onboard batteries. Specifically, wireless charging is more attractive and easier to use for the users. FIG. 1 illustrates an exemplary online EV wireless charging environment 100 incorporating certain disclosed embodiments.

As shown in FIG. 1, EV wireless charging environment (system) 100 may include an electrical vehicle (EV) 102, a server 104, a network 103, a charging station 110, and a user terminal 120. Other components may also be included.

The network 103 may include any appropriate type of communication network for providing network connections to the various components in the EV wireless charging environment 100. For example, network 103 may include the Internet, LAN (Local Area Network), or other types of computer networks or telecommunication networks, either wired or wireless, such 5G wireless networks. The various components of the EV wireless charging environment 100 may be interconnected with one another via the network 103 or through other additional forms of wireless/wired connections. For example, the mobile terminal 120 may be connected to the EV 102 via a Bluetooth connection, and the charging station 110 may be connected to the EV 102 and/or the mobile termina 120 via an NFC (near field communication) connection or a Bluetooth connection.

Server 104, as used herein, may refer to one or more server computers configured to provide certain server functionalities, such as storing or processing data related to users, user online activities, user applications, user usage patterns, EV charging stations, EV charging applications, EVs, financial transactions, etc. For example, the server 104 may authenticate any user accessing the EV charging services provided by the server 104. The server 104 may also include one or more processors to execute computer programs, and may operate in a cloud or non-cloud computing environment. Although only one server is shown, any number of servers can be included. For example, one server 104 may control operation of the charging station 110 and one server 104 may control user access to charging services, such as authentication, activation, transaction, and customer management, etc.

The EV 102 may include any appropriate type of wholly or partially battery-powered vehicle, such as an automobile, bus, truck, locomotive, motorcycle, scooter, golf cart, tractor, snowmobile, boat, air drone, plane, or robot. The EV 102 may be driven by a user or may be driven autonomously, and may include both completely electric vehicles and hybrid vehicles that may include a combustion engine or other type of engine.

The user terminal 120 may include any appropriate type of network computing devices, such as PCs, tablet computers, smartphones, pads, mobile phones, or other Tot (internet of things) devices. The user terminal 120 may be a separate device from a user or driver of the EV 102. Alternatively, the user terminal 120 may be integrated into an onboard computer system of the EV 102 with a dashboard display for the user or driver to use.

The charging station 110 may include any appropriate type of electrical and electronic system for charging batteries of the EV 102 by a wireless charging connection and/or a wired charging connection. In certain embodiments, the charging station 110 may be a wireless charging station that is integrated into a surrounding structure of a parked EV. For example, the charging station 110 may be built into the ground on which the EV can be parked. The charging station 110 may also be built into other structures, such as a wall, or a road curb or road bumper, etc.

Figure 2:
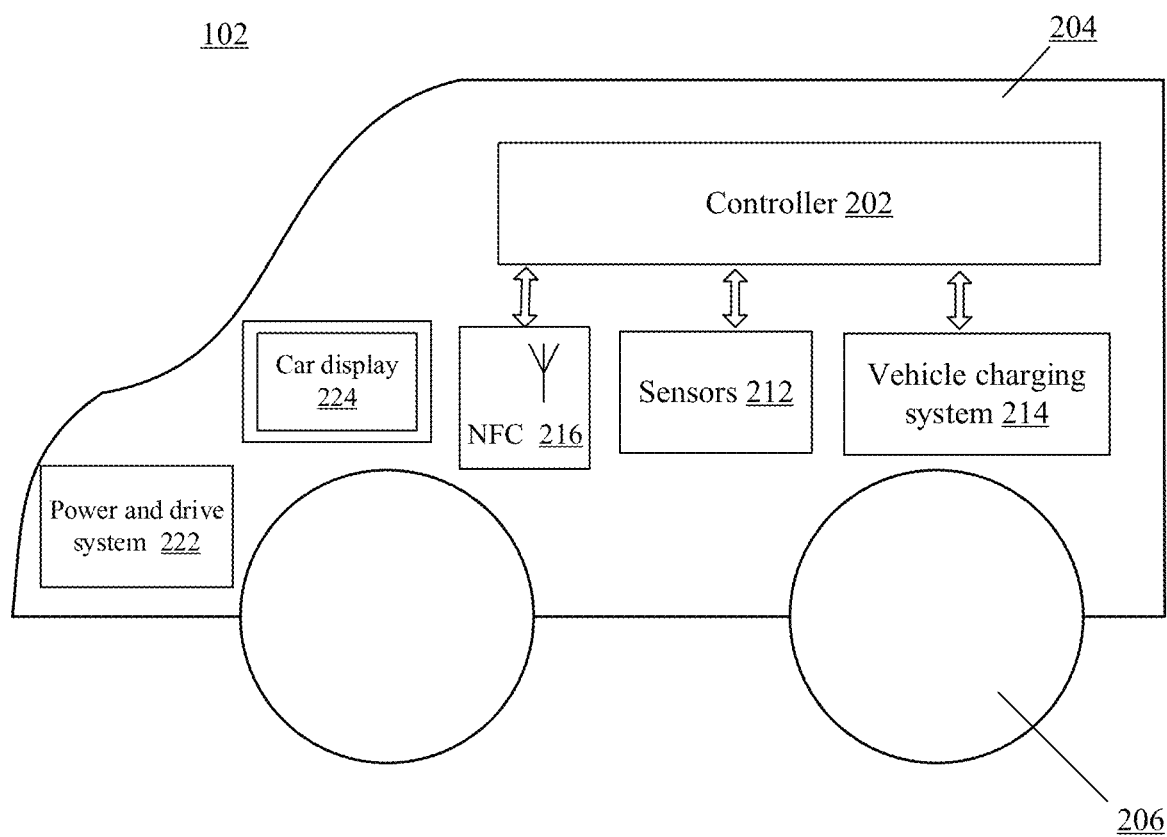
FIG. 2 illustrates a block diagram of an exemplary EV consistent with the disclosed embodiments.

Because wireless charging of electrical vehicles often involves not only electric power transfer, but also user access and/or transaction, more entities may be involved besides the charging station and the electric vehicle. Thus, the EV 102, the charging station 110, the user terminal 120, and/or the server 104 may include certain structures configured to charge onboard batteries of the EV 102 from the charging station 110 wirelessly. The EV 102 may also include relevant structures to support such wireless charging. FIG. 2 illustrates a block diagram of an exemplary EV consistent with the disclosed embodiments.

As shown in FIG. 2, the EV 102 may include a vehicle body 204 and a set of wheels 206. The EV 102 may also include a power and drive system 222, and a car display 224. Further, the EV 102 may include a controller 202, sensors 212, an NFC module 216, and a vehicle charging system 214. Certain components may be omitted and other components may be added.

The vehicle body may include various structures (e.g., a chassis, a frame, interiors) for housing components of the EV 102, as well as any user/driver/passenger of the EV 102. The wheels 206 may include any propulsion means to propel the EV 102 to move, as driven by the power and drive system 222. The power and drive system 222 may include parts and components for providing power and motion control of the EV 102, such as a motor system (not shown), a battery system (not shown), a power train, and a set of user controls 36 (e.g., a foot pedal, a keyed switch, a maintenance switch, etc.). The motor systems may include a plurality of motors coupled to the wheels 206 to drive the wheels 206 to provide motion, powered by the battery system. The battery system may include a plurality of rechargeable batteries, such as lithium batteries.

Further, the car display 224 may provide an integrated user interface between the user and the EV 102, including a touch screen, a voice input device, and/or a keypad/mouse device. The controller 202 may include one or more hardware processors and other related components for providing various control functionalities for other components of the EV 102.

The NFC module 216 may include a communication module using a near field communication technology or similar close range wireless communication technologies, such as radio-frequency identification (RFID), Bluetooth, etc. The NFC module 216 may communicate with the charging station 110 over an NFC communication channel to exchange vehicle and/or charging station information, etc.

The Sensors 212 may include a variety of sensors used by the EV 102 to acquire internal and external information, such as speed sensors, acceleration sensors, GPS sensors, vision sensors (e.g., cameras), distance sensors, position sensors, temperature sensors, and voltage and current sensors, etc. Thus, via the sensors 212, the EV 102 (e.g., the controller 202) may acquire the various internal and external information, including vehicle speed, acceleration, vehicle location, images and other visual information, distance information, position information, temperature information, and voltage and current of batteries and other circuitries of the EV 102, etc.

Figure 3A:
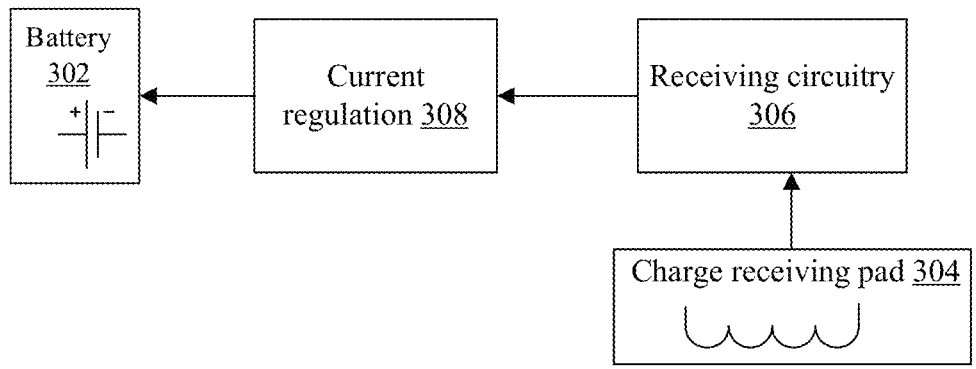
FIG. 3A illustrates a block diagram of an exemplary vehicle charging system consistent with the disclosed embodiments.

Further, the vehicle charging system 214 may be configured to receive electric charges from an external charge station, through a wireless connection and/or a wired connection. The vehicle charging system 214 may include separate components for conductive (wired) charging and inductive (wireless) charging of the EV 102. Alternatively, the vehicle charging system 214 may include integrated circuitries for both conductive (wired) charging and inductive (wireless) charging of the EV 102, using different charging ports. In certain embodiments, for illustrative purposes, the vehicle charging system 214 includes a wireless charging system based on the principle of induction. FIG. 3A illustrates a block diagram of an exemplary vehicle charging system consistent with the disclosed embodiments.

As shown in FIG. 3A, the vehicle charging system 214 may include a battery 302, a charge receiving pad 304, a receiving circuitry 306, and a current regulation module 308. Other components may also be included. The battery 302 may include any appropriate type of rechargeable battery, such as lithium ion or lithium metal battery. The battery 302 may also include a battery management system for control charging and discharging of the battery 302. Further, a variety of form factors may be suitable for the battery 302. For example, the battery 302 may include multiple batteries, multiple battery cells, a single battery pack or multiple battery packs, and so on.

The receiving circuitry 306 may include circuitry connected to the coil(s) of the charge receiving pad 304 to receive electric current generated by the coil(s) during wireless charging from the charging station 110. The current regulation module 308 may include circuitry operating to condition (e.g., rectify and convert) the power that is provided to the battery 302.

Figure 3B:
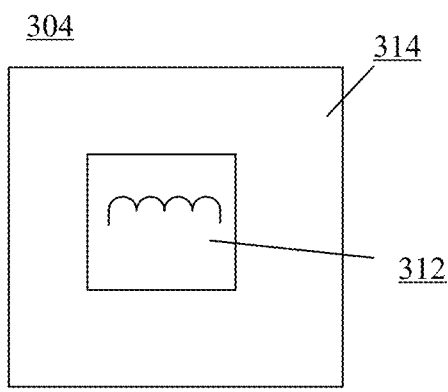
FIGS. 3B-3C illustrate certain exemplary charge receiving pads consistent with the disclosed embodiments.

The charge receiving pad 304 may be configured to couple to a charge transmitting pad of the charging station 110 to receive power charge wirelessly. Power can be wirelessly conveyed from one place to another using the Faraday effect, whereby a changing magnetic field causes an electrical current to flow in an electrically isolated secondary circuit. A form of wireless power transfer may involve magnetic inductive charging. Other forms of wireless power transfer may also be used. Thus, the charge receiving pad 304 may be aligned with the charge transmitting pad in relatively close proximity such that a coil(s) of the charge transmitting pad acts as a wireless power transmitter and a coil(s) of the charge receiving pad 304 act as a wireless power receiver. FIG. 3B illustrates a block diagram of an exemplary charge receiving pad consistent with the disclosed embodiments.

As shown in FIG. 3B, the charge receiving pad 304 may include a housing 314 and a coil 312. The housing 314 may be mounted to the EV 102 and may house the coil 312. For example, the housing 314 may be mounted to an underside of the EV 102, such as the chassis of the EV 102. In other embodiments, the housing 314 may also be mounted to other places of the EV 102, such as the frontside of the EV 102, the rear side of the EV 102, or the top side of the EV 102. Further, although not shown, movement structures may also be provided within the housing 314 to move the coil 312 vertically and/or horizontally so as to achieve better alignment with the coil(s) of the charge transmitting pad of the charging station 110. Optionally or additionally, movement structures may be provided to move the housing 314 vertically and/or horizontally so as to achieve better alignment between the coil 312 and the coil(s) of the charge transmitting pad of the charging station 110.

Figure 3C:
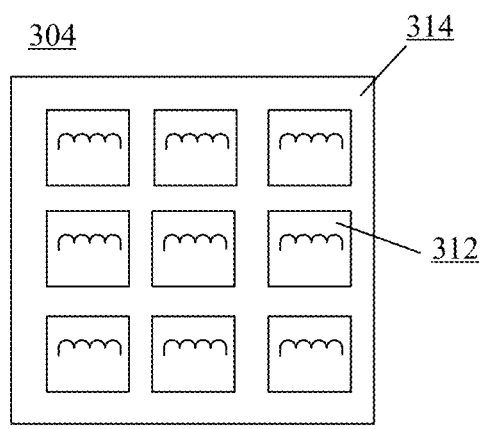

Further, although only one coil 312 is shown in FIG. 3B, multiple coils may be provided. For example, as shown in FIG. 3C, a plurality of coils 312 may be provided with the housing 314. The plurality of coils 312 may be arranged in an array. In certain embodiments, the plurality of coils 312 may be arranged in a circle or other geometric shapes. Further, the current generated by the plurality of coils 312 may be combined together to charge the battery 302. Alternatively, the plurality of coils 312 may be separated into certain groups, with each group charging a battery cell or a battery pack, such that parallel charging may be achieved. In another embodiment, each coil may be connected to a battery pack for charging. Other arrangement may also be used according to various embodiments of the present disclosure.

Figure 4A:
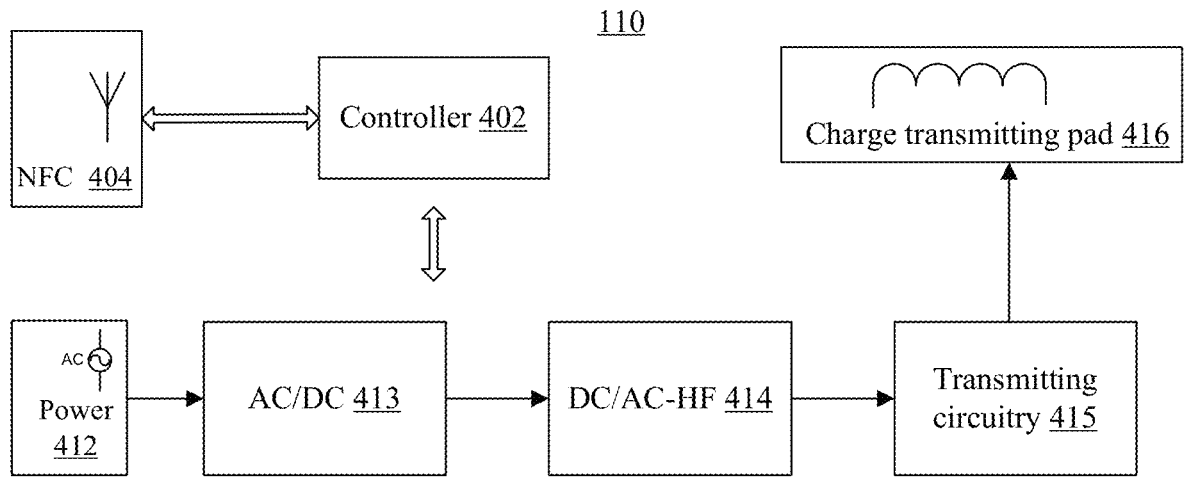
FIG. 4A illustrates a block diagram of an exemplary charging station consistent with the disclosed embodiments.

Returning to FIG. 2, the vehicle charging system 214 may be controlled by the controller 202 (along with other modules controlled by the controller 202, such as the power and drive system 222, the car display 224, the sensors 212, and the NFC module 216) to realize wireless power charging of the EV 102 from the charging station 110. The charging station 110 may be provided corresponding structure to support wireless charging of the EV 102. FIG. 4A illustrates a block diagram of an exemplary charging station 110 consistent with the disclosed embodiments.

As shown in FIG. 4A, the charging station 110 may include a power source 412, an AC/DC module 413, a DC/AC-HF module 414, a transmitting circuitry 415, and a charge transmitting pad 416. The charging station 110 may also include a controller 402 and an NFC module 404. Certain components may be omitted and other components may be added.

The controller 202 may include one or more hardware processors and other related components for providing various control functionalities for other components of the charging station 110. The NFC module 404 may communicate with the EV 102 and/or the user terminal 120 over an NFC or similar communication channel to exchange charging station information and/or vehicle, etc., to facilitate a wireless charging process. For example, the charging rate may be communicated between the charging station 110 and the EV 102. As EV charging rates tend to vary based on a number of factors including: size of the EV battery, grid power supply, wireless charging frequency, and the EV usage profile. Typical EV traction motors used for propulsion are specified using a number of performance factors, including: EV weight, speed, and load conditions during operation etc.

The power source 412 may include any appropriate external power source for charging an EV. For example, the power source 412 may represent a conventional alternating current (AC) electrical power distribution network or grid as provided by an electric utility company. In certain embodiments, the power source 412 may be from multiple power distribution networks from one or more electric utility companies.

The AC/DC module 413, an alternating current (AC) to direct current (DC) converter module, may be provided to include circuitry to condition and convert the AC power from the power source 412 to a DC current for further processing. The DC/AC-HF module 414 may include circuitry to convert the DC current into a relatively higher frequency AC (e.g., 80-100 khz) suitable for wireless power transmission. Further, the transmitting circuitry 415 may be coupled to a coil(s) of the charge transmitting pad 416 to transmit the AC current to the coil(s).

Figure 4B:
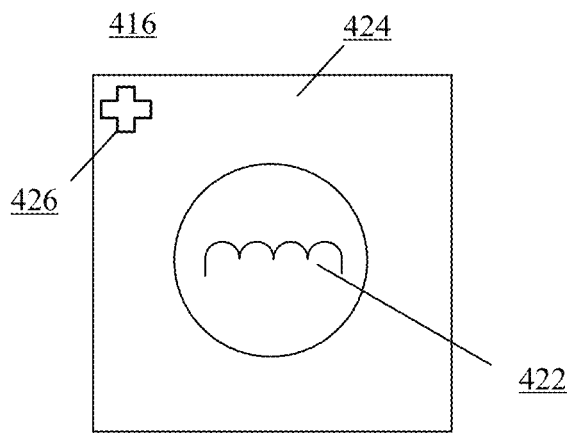
FIGS. 4B-4G illustrate certain exemplary charge transmitting pads consistent with the disclosed embodiments.

The charge transmitting pad 416 may be configured to couple to the charge receiving pad 304 of the EV 102 to transmit power charge wirelessly, when the charge receiving pad 304 is aligned with the charge transmitting pad 416 in relatively close proximity. FIG. 4B illustrates a block diagram of an exemplary charge transmitting pad consistent with the disclosed embodiments.

As shown in FIG. 4B, the charge transmitting pad 416 may include a housing 424, a coil 422, and a reference mark 426. The housing 424 may house the coil 422 and may be mounted to an underlying surface, such as a garage floor or a parking space floor. The housing 424 may also be mounted to other type of surface, such as a wall surface or a ceiling surface, or a road surface, etc. The reference mark 426 may include any type of mark provided as certain reference points or providing certain reference information. For example, the reference mark 426 may include a two-dimensional (2D) bar code to provide reference information about the charging station 110, such as the location, identification, characteristics of the charging station 110, etc. For another example, the reference mark 426 may include an image pattern positioned in a fixed location of the housing 424 and the EV 102 may capture the image pattern via the various sensors. The EV 102 may determine, based on the image pattern, a displacement of the charge receiving pad 304 to the charge transmitting pad 416, and may adjust the displacement to facilitate the wireless charging of the EV 102 from the charging station 110. Further, the reference mark may be placed at a location optimized to achieve the above functionalities, such as at the left upper corner or at the center of the charging station 110 or the charge transmitting pad 416 of the charging station 110, etc.

Figure 4C:
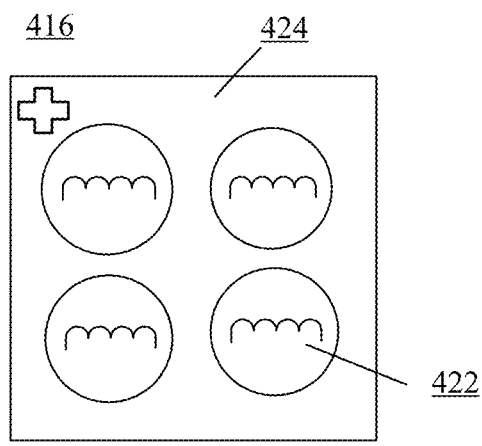

The coil 422 may include any appropriate type of coil for wireless power transmission. Although only one coil 422 is shown in FIG. 4B, multiple coils may be provided. For example, as shown in FIG. 4C, a plurality of coils 422 may be provided with the housing 424. The plurality of coils 422 may be arranged in an array. In certain embodiments, the plurality of coils 422 may be arranged in a circle or other geometric shapes.

Figure 4D:
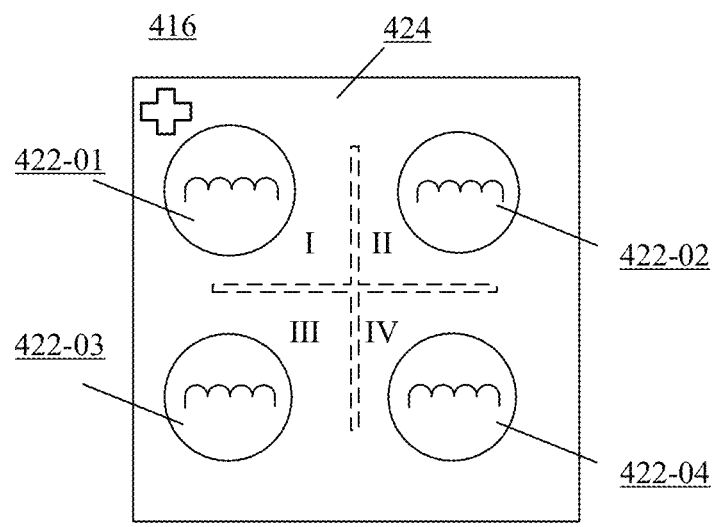

In certain embodiments, the charge transmitting pad 416 may include multiple regions, each region may contain one or more coils 422 and may be controlled independently to operate. That is, the regions may operate independently under the control of the controller 402 to provide wireless charges to the EV 102. As shown in FIG. 4D, the charge transmitting pad 416 includes region I, region II, region III, and region IV, which contains coil 422-01, coil 422-02, coil 422-03, and coil 422-04, respectively. The multiple regions may be used to facilitate the wireless charging based on different charging scenarios. For example, the multiple regions may be used to implement different charging rates, e.g., a single charging rate, to a double charging rate, a triple charging rate, and/or a quadruple charging rate, etc.

Figure 4E:
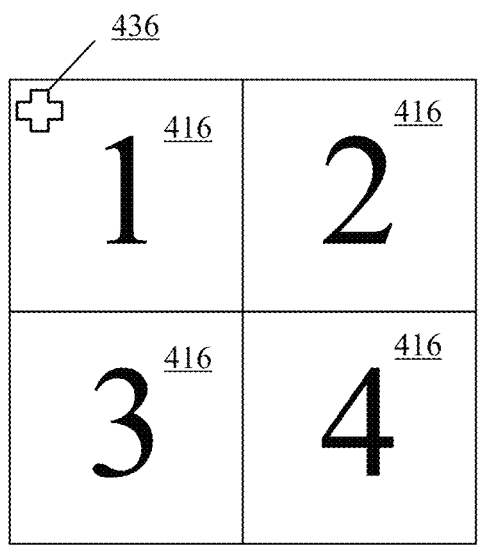
Figure 4F:
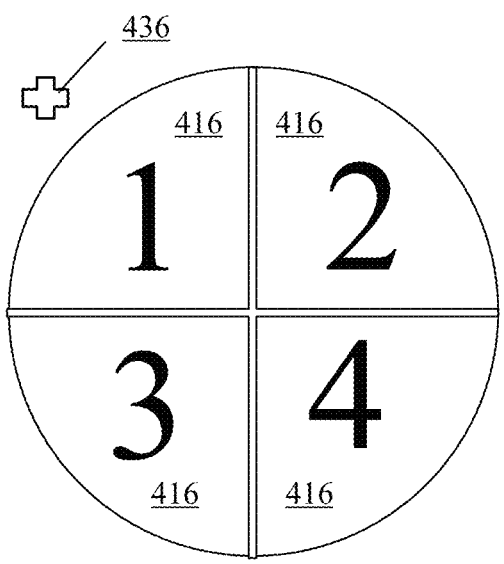
Figure 4G:
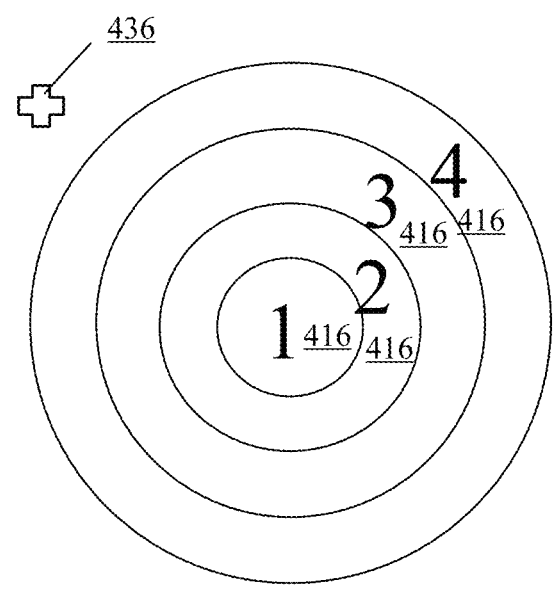

Further, in certain embodiments, the charge transmitting pad 416 may include multiple charge transmitting pads 416. That is, multiple charge transmitting pads 416 may be provided as a combined charging pad group. The charge transmitting pads may be from different service providers, or from different power sources or distribution networks. The charge transmitting pads may also be from a same service provider, but may be provided from other purposes, such as to add charging capacity or improve charging rates. etc. FIGS. 4E-4G illustrate certain configurations of an exemplary charging pad group consistent with the disclosed embodiments. Under certain circumstances, in the following discussion of the charging pad group, the above multiple regions may also be treated as multiple charge transmitting pads.

As shown in FIG. 4E, the charging pad group may include a total of four charge transmitting pads 416, represented as charging pad 1, charging pad 2, charging pad 3, and charging pad 4 arranged in an array configuration. The charging pad group may also include a reference mark 436 for the entire charging pad group. As shown in FIG. 4F, the charging pad group is in a circle configuration, and the charging pad 1, charging pad 2, charging pad 3, and charging pad 4 are arranged in a sector configuration or quadrant configuration. Further, as shown in FIG. 4G, the charging pad group is in a circle configuration, and the charging pad 1, charging pad 2, charging pad 3, and charging pad 4 are arranged in a ring configuration. Other configurations may also be used for the charging pad group and the charging pads.

Figure 5:
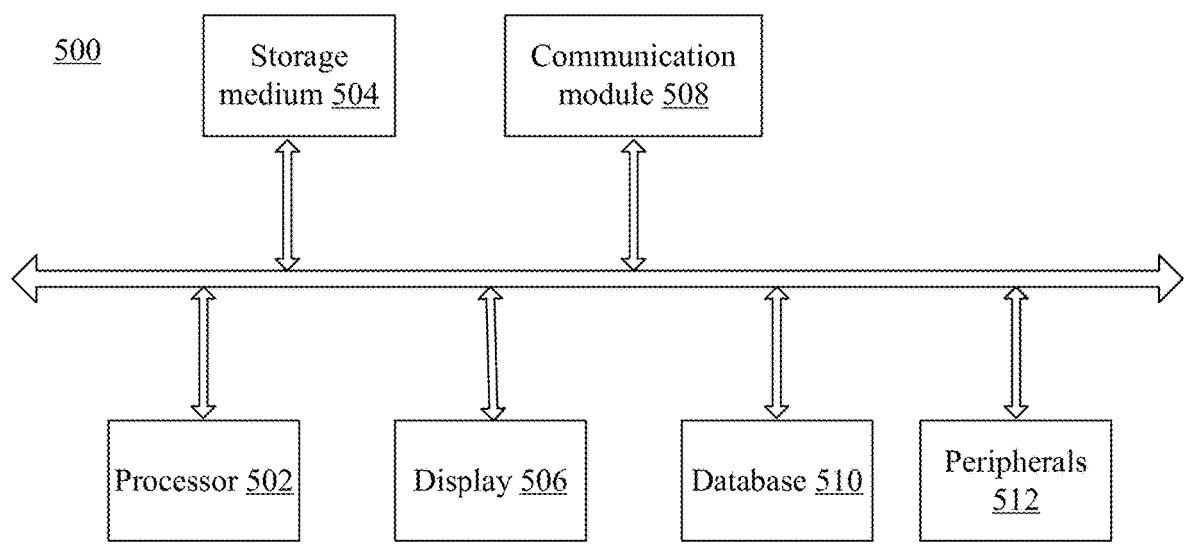
FIG. 5 illustrates a block diagram of an exemplary computer system consistent with the disclosed embodiments.

In operation, also referring to FIG. 1, the EV 102 may be in a position close to the charging station 110 such that the charge transmitting pad of the charging station 110 and the charge receiving pad of the EV 102 are in proximity for a wireless charging process. The wireless charging process may be performed by the EV 102 and the charging station 110, as well as server 104 and/or mobile terminal 120. For example, the controller 202 of the EV 102, the controller 402 of the charging station 110, the mobile terminal 120, and/or the server 104 may communicate with one another to facilitate and control the wireless charging process. FIG. 5 illustrates a block diagram of an exemplary computer system 500 capable of implementing the controller 202 of the EV 102, the controller 402 of the charging station 110, the mobile terminal 120, and/or the server 104. Components may be omitted or added according to actual implementations.

As shown in FIG. 5, computer system 500 may include a hardware processor 502, storage medium 504, a display 506, a communication module 508, a database 510, and peripherals 512. Certain devices may be omitted, and other devices may be included.

Processor 502 may include any appropriate processor or processors. Further, processor 502 can include multiple cores for multi-thread or parallel processing. Storage medium 504 may include memory modules, such as Read-only Memory (ROM), Random Access Memory (RAM), flash memory modules, and erasable and rewritable memory, and mass storages, such as CD-ROM, U-disk, and hard disk, etc. Storage medium 504 may store computer programs for implementing various processes, when executed by processor 502. Display 506 may include any appropriate display for displaying data processed by the processor 202, such as an LCD display screen or a touch screen, etc. For the EV 102, the display 506 may coincide with the car display 224.

Further, peripherals 512 may include I/O devices such as a keyboard and a mouse. Communication module 508 may include network devices for establishing connections through the network 103. Database 510 may include one or more databases for storing certain data and for performing certain operations on the stored data, such as database searching and analysis.

In operation, returning to FIG. 1, the server 104, mobile terminal 120, EV 102, and charging station 110 may interact with one another to perform the wireless charging process and/or other related processes. To implement the processes, the server 104 may include a server application, which may interact with client applications on mobile terminal 120, EV 102, and/or charging station 110. A client application may communicate with the server application or may communicate with another client application to implement the processes.

In one embodiment, the mobile terminal 120 may include a mobile App (application program) configured to interact with the server 104. The EV 102 may include an application (e.g., CarPlay) to delegate control to the App on the mobile terminal 120 for controlling the wireless charging process on the EV 102. That is, the mobile terminal 120 may control related components of the EV 102 to perform the wireless charging process as well as act as the car display 224 for user interaction. At the same time, the mobile terminal 120 may also directly communicate with the charging station 110 over a wireless communication channel to obtain information for the wireless charging process.

Figure 6:
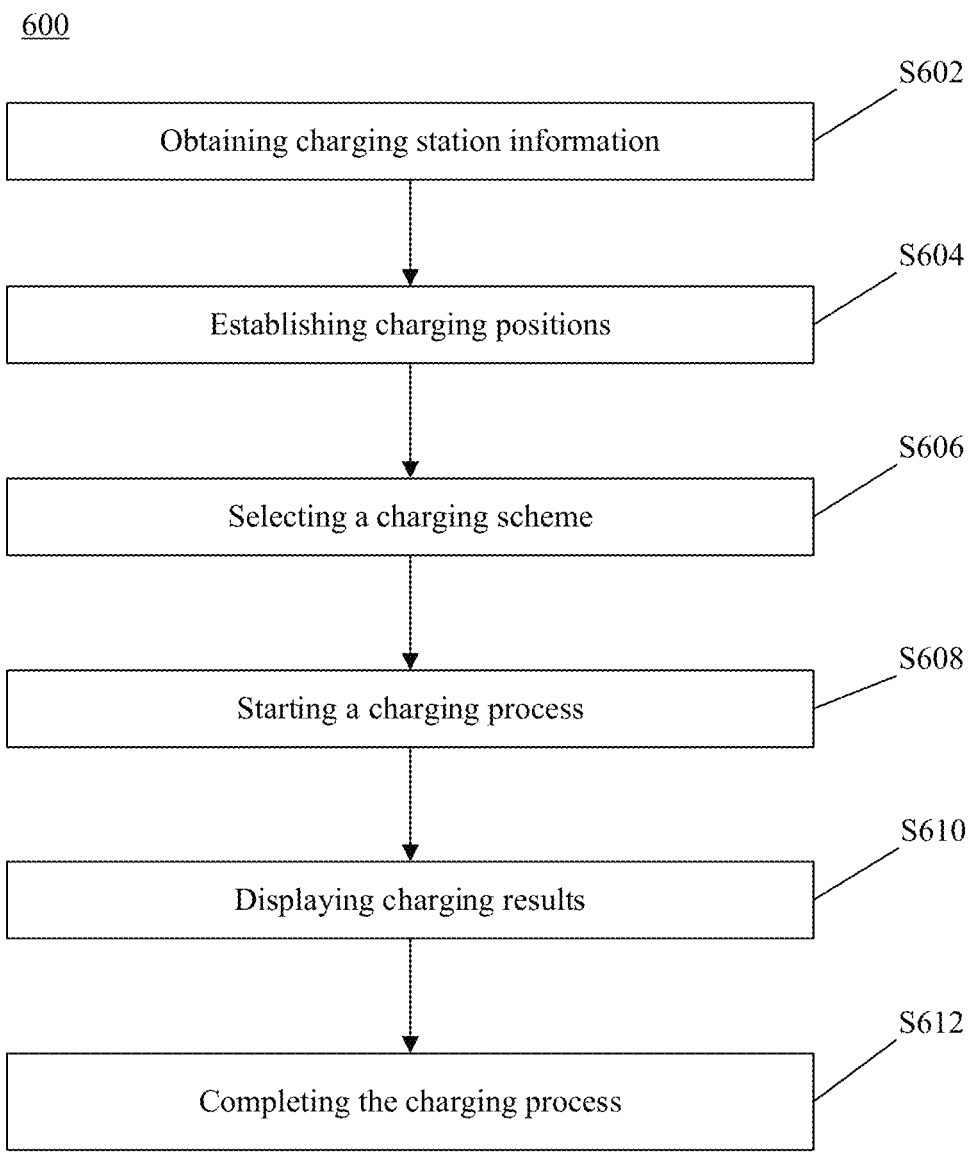
FIG. 6 illustrates an exemplary wireless charging process consistent with the disclosed embodiments.

In another embodiment, the mobile terminal 120 may be omitted, and the EV 102 may include the client application and may directly interact with the server 104, having all the functionalities of the mobile App on the mobile terminal 120 in an onboard system including the car display 224. Further, in another embodiment, the mobile terminal 120 and the EV 102 may both interact with the server 104 and the charging station 110, as well as with each other, and may split the control functionalities for the wireless charging process. For illustrative purposes, unless specifically stated, various embodiments below are described using the mobile terminal 120 as the control entity for the wireless charging process. FIG. 6 illustrates an exemplary wireless charging process 600 consistent with disclosed embodiments of the present disclosure.

As shown in FIG. 6, at the beginning of the wireless charging process, charging station information may be obtained (S602). For example, after the EV 102 comes close to the charging station 110 (e.g., after EV 102 enters a parking position over the charging station 110), the processor 502 (e.g., the mobile terminal 120 and/or the EV 102) may obtain the information about the charging station 110. The charging station information may include any appropriate type of information about the charging station 110. For example, the charging station information may include a charging station number or ID, a charging station type, a location, a dimension and size, a server ID, a charging network, a power source, a charging rate/speed, and transaction information for financial transaction. The charging station number or ID may indicate a charging station identifier; the charging station type may indicate what type of this charging station, e.g., whether it is a single charging pad or a charging pad group; the location may indicate the location and/or position of the charging station or charging pad; the dimension and size may indicate the shape and size of the charging pad, e.g., a square with each side being 20 inches; the server ID may indicate an ID to access the server managing the charging station, e.g., a universal resource locator (URL) of the server; the charging network may indicate which distribution network operator or charging station operator controls the charging station; the power source may indicate the type of power used for charging, e.g., ordinary or non-renewable, or renewable such as wind, solar, and so on; the charging rate/speed may indicate the available charging rate for the charging station, e.g., normal charging rate, fast charging rate, super-fast charging rate, etc. Other information may also be included. Further, when the charging station 110 includes a charging pad group, the charging station information may include relevant information of each charging pad separately.

The processor 502 may obtain the charging station information from various sources. For example, the processor 502 may obtain the charging station information directly from the charging station 110 via a wireless communication channel between the charging station 110 and the EV 102 and/or the mobile terminal 120. Alternatively, the processor 502 may also first obtain the ID of the charging station 110 from the reference mark of the charging station 110 or similar images captured by the EV 102 or the mobile terminal 120, or from the wireless communication channel between the charging station 110 and the EV 102 and/or the mobile terminal 120. After obtaining the ID of the charging station 110, the processor 502 may send the ID to the server 104 and may obtain the charging information from the server 104. That is, the server 104 may include a charging station database and may obtain the charging station information of a particular charging station based on the ID and send the charging station information back to the processor 502.

Figure 7A:
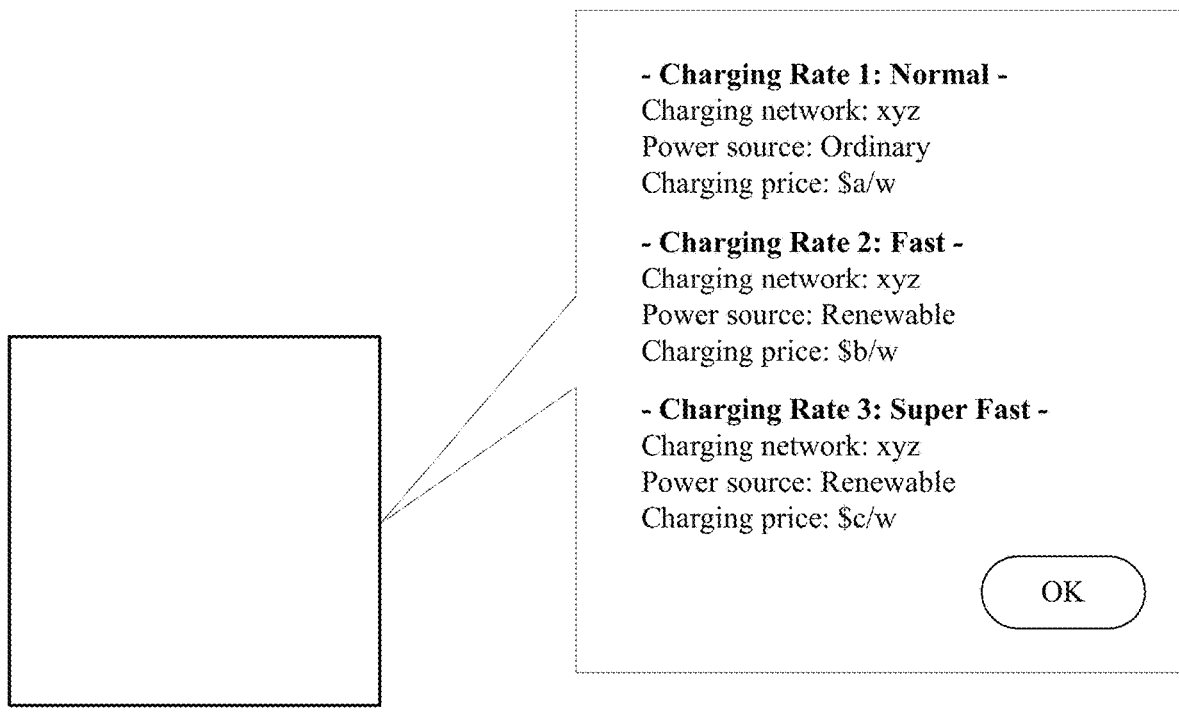

After obtaining the charging station information or the charging information, the processor 502 may display certain charging information to the user such that the user may determine whether to charge the EV 102 at this particular charging station. For example, the processor 502 may prompt the user with a beep or an audio voice alert to indicate that wireless charging is available, or the processor 502 may display a message to indicate that wireless charging is available. Further, automatically or based on an user input or response, the processor 502 may further display the detailed charging station information. FIGS. 7A-7B illustrate certain exemplary charging station information displays consistent with the disclosed embodiments.

As shown in FIG. 7A, a single charging pad is presented and a total of three charging rates (e.g., a normal charging rate, a fast charging rate, and a super-fast charging rate) are available for the charging pad of the charging station 110. Each charging rate is displayed to the user along with relevant information such as charging network, power source, and charging price, etc. Any number of charging rates may be used and other information may also be displayed.

As shown in FIG. 7B, a charging pad group is presented and a total of four charging pads are included. Each charging pad is displayed to the user along with its associated charging information. For example, charging pad 1 is from charging network xyz, power source is ordinary, charging rate is super-fast, and the charging price is $a/w; charging pad 2 is from charging network uvw, power source is solar power, charging rate is normal, and the charging price is $b/w; charging pad 3 is from charging network opq, power source is wind power, charging rate is fast, and the charging price is $c/w; charging pad 4 is from charging network rst, power source is renewable power, charging rate is multiple (e.g., supporting more than one charging rate, such as normal, fast, or super-fast), and the charging price is $d/w. Any number of charging pads may be used and other information may also be displayed. The labels "1", "2", "3", and "4" for the charging pads 1, 2, 3, and 4 may be the actual labels on the charging pads of the charging station, or may be added to the image of the charging pads before displaying the charging pads. In addition to adding the numeral labels or similar markings, letters and other alphabet symbols may also be used. In certain embodiments, different colors may be added to the display to differentiate the charging pads. For example, the charging pad 1 may be marked red, the charging pad 2 may be marked green, the charging pad 3 may be marked blue, and the charging pad 4 may be marked yellow. Any color may be used.

Figure 8:
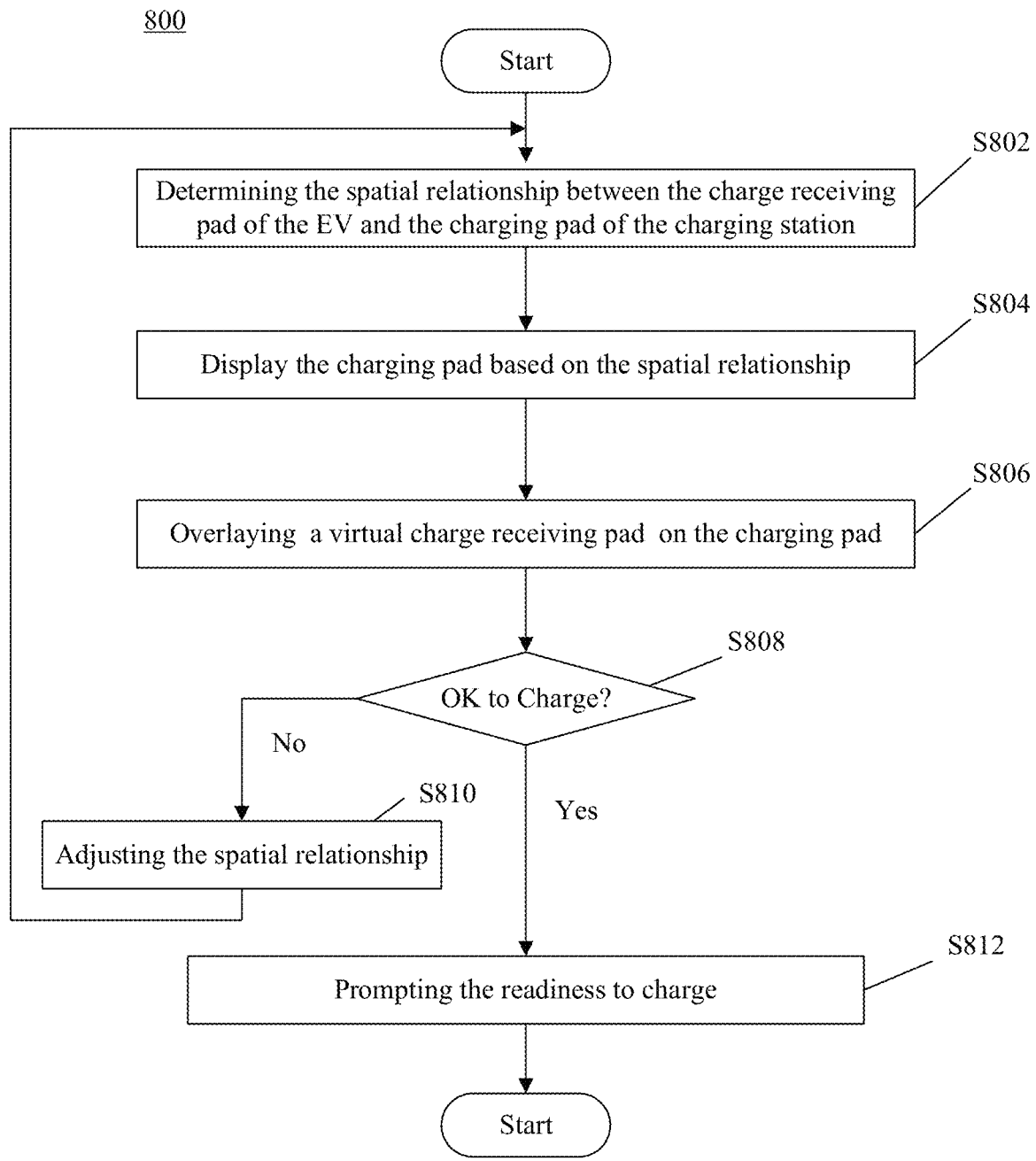
FIG. 8 illustrates an exemplary positioning process consistent with the disclosed embodiments.

Further, returning to FIG. 6, a charging position may be established between the EV 102 and the charging station 110 (S604). For example, the processor 502 may perform a positioning process to establish the charging position of the EV 102. FIG. 8 illustrates an exemplary positioning process consistent with the disclosed embodiments.

As shown in FIG. 8, at the beginning of the positioning process, the processor 502 may determine the spatial relationship between the charge receiving pad of the EV 102 and the charging pad of the charging station 110 (S802). For example, the processor 502 may determine the vertical distance between the charge receiving pad of the EV 102 and the charging pad of the charging station 110, the shape or boundary of the charging pad of the charging station 110, the dimensions (e.g., length, width, radius, etc.) of the shape or boundary of the charging pad of the charging station 110, and the orientation (e.g., the angle between vertical axis of the two pads) of the charging pad of the charging station 110 with respect to the charge receiving pad of the EV 102. Other spatial relationships may also be used.

Further, the processor 502 may display the charging pad based on the spatial relationship (S804). For example, the processor 502 may first display an image of the charging pad. The image of the charging pad may be obtained by a camera sensor, or may be obtained from server 104. The processor 502 may also overlay a virtual charge receiving pad on the top of the displayed charging pad (S806). The virtual charge receiving pad may represent the actual charge receiving pad of the EV 102, and the size or dimensions of the virtual charging receiving pad may indicate the relative size or dimensions of the actual charge receiving pad of the EV 102 with respect to the displayed charging pad of the charging station 110. FIGS. 9A-9I illustrate certain relative positions of the charging pad of the charging station 110 and the charge receiving pad of the EV 102 (represented by the virtual charge receiving pad) consistent with the disclosed embodiments.

Figure 9A:
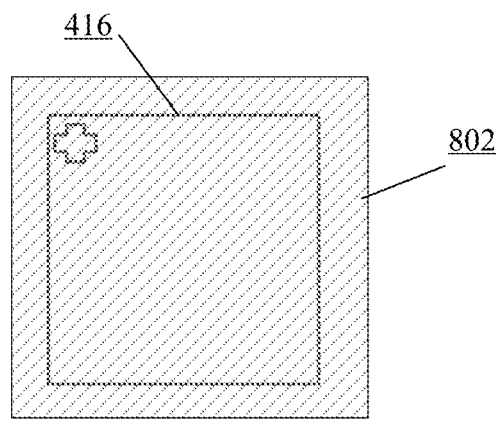
FIGS. 9A-9J illustrate certain displays of the charge receiving pad of the electric vehicle and the charging pad of the charging station consistent with the disclosed embodiments.

As shown in FIG. 9A, the charge receiving pad is larger than and covers the charging pad of the charging station 110, while the orientation of the charge receiving pad is the same as that of the charging pad of the charging station 110.

Figure 9B:
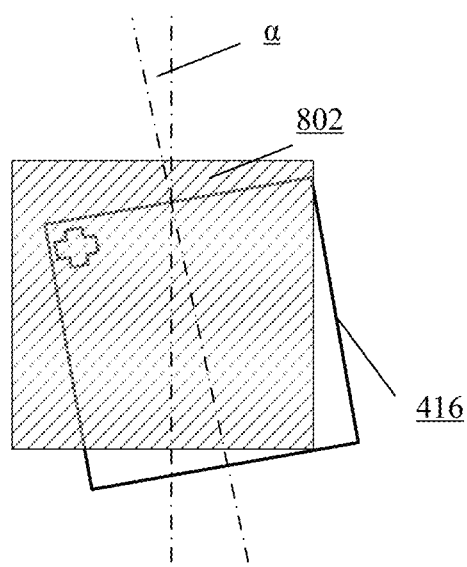

As shown in FIG. 9B, the charge receiving pad is roughly the same as the charging pad of the charging station 110 and covers most part of the charging pad of the charging station 110. However, with respect to orientation, there is an angle α between the vertical axis of the charge receiving pad and the charging pad of the charging station 110.

Figure 9C:
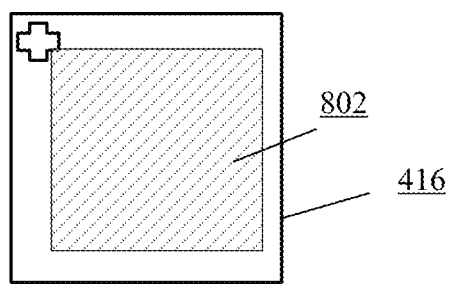

As shown in FIG. 9C, the charge receiving pad is smaller than and covers the charging pad of the charging station 110, while the orientation of the charge receiving pad is the same as that of the charging pad of the charging station 110.

Figure 9D:
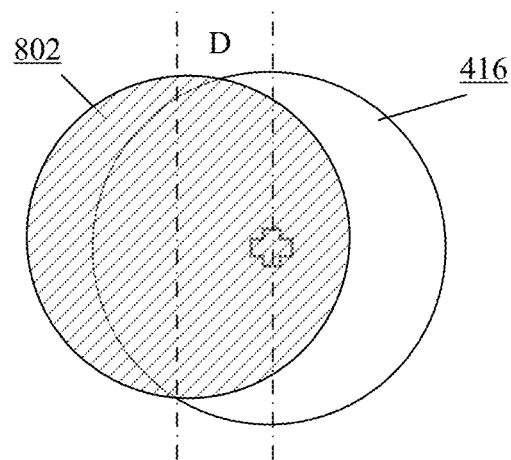

As shown in FIG. 9D, the charge receiving pad is roughly the same as the charging pad of the charging station 110, but there is a significant part of the charging pad is not overlapped by the charge receiving pad. The displacement D between the charge receiving pad and the charging pad of the charging station 110 may also be determined. Further, because both the charge receiving pad and the charging pad of the charging station 110 have the shape of a circle, the orientation of the charge receiving pad is the same as that of the charging pad of the charging station 110.

Figure 9E:
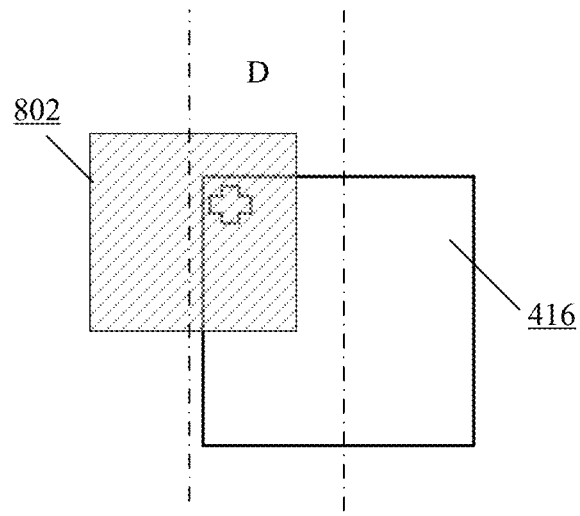

As shown in FIG. 9E, the charge receiving pad is smaller than the charging pad of the charging station 110, and only covers a small part of the charging pad of the charging station 110. The orientation of the charge receiving pad is the same as that of the charging pad of the charging station 110. The displacement D between the charge receiving pad and the charging pad of the charging station 110 may also be determined.

Figure 9F:
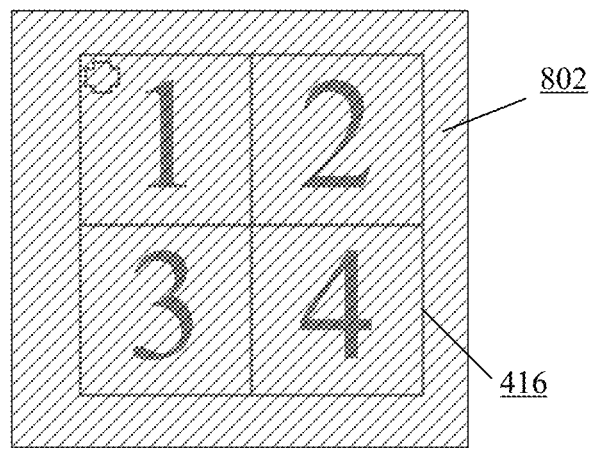

As shown in FIG. 9F, the charging station 110 includes a charging pad group as the charge transmitting pad. The charge receiving pad is larger than and covers the charging pad group of the charging station 110, while the orientation of the charge receiving pad is the same as that of the charging pad group of the charging station 110.

Figure 9G:
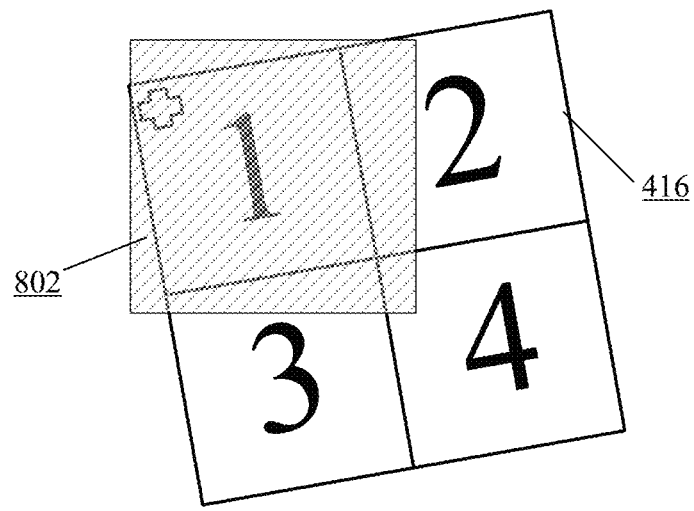

As shown in FIG. 9G, the charging station 110 includes a charging pad group as the charge transmitting pad. The charge receiving pad is smaller than the charging pad group of the charging station 110, but is larger than the charging pad 1 of the charging pad group and covers the charging pad 1 of the charging station 110. However, with respect to orientation, there is an angle between the vertical axis of the charge receiving pad and the charging pad group of the charging station 110.

Figure 9H:
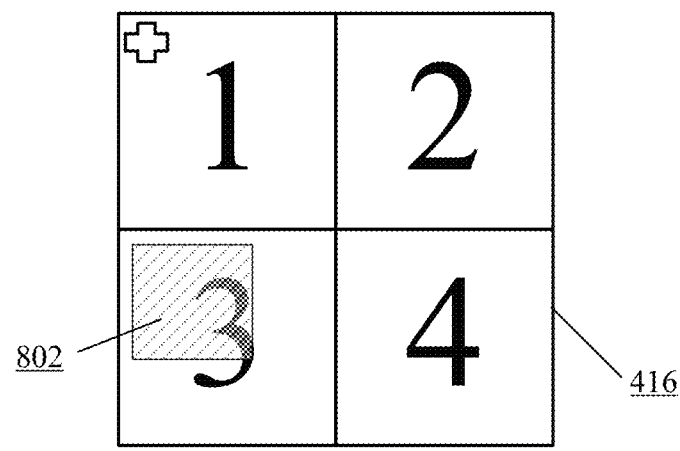

As shown in FIG. 9H, the charging station 110 includes a charging pad group as the charge transmitting pad. The charge receiving pad is smaller than any charging pad of the charging pad group, and covers only part of the charging pad 3 of the charging station 110. The orientation of the charge receiving pad is the same as that of the charging pad group of the charging station 110.

Figure 9I:
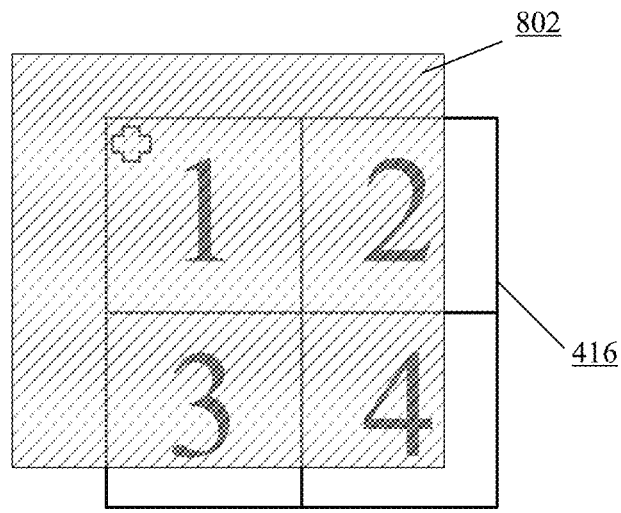

As shown in FIG. 9I, the charging station 110 includes a charging pad group as the charge transmitting pad. The charge receiving pad is roughly the same as the charging pad group of the charging pad group, and covers the charging pad 1 as well as significant parts of the charging pads 2, 3, and 4. The orientation of the charge receiving pad is the same as that of the charging pad group of the charging station 110.

Figure 9J:
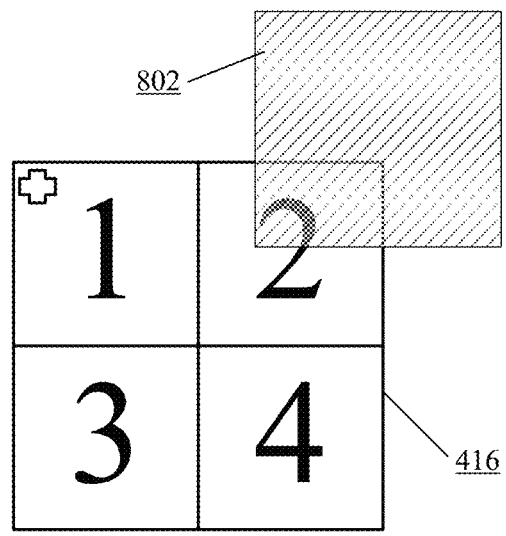

As shown in FIG. 9J, the charging station 110 includes a charging pad group as the charge transmitting pad. The charge receiving pad is smaller than the charging pad group of the charging pad group, but is larger than any individual charging pad. The charge receiving pad only covers a small part of the charging pad 2. The orientation of the charge receiving pad is the same as that of the charging pad group of the charging station 110. In all scenarios involving the charging pad group, the displacement between the charge receiving pad and the individual charging pads may also be determined, respectively.

Further, while the displayed charge receiving pad is a virtual image (i.e., generated by the processor 502), the displayed charging pad may be an image of the actual charging pad of the charging station 110, an enhanced image of the actual charging pad of the charging station 110, or a virtual image of the actual charging pad of the charging station 110 generated by the processor 502. For example, when the image of the charging pad is obtained by a camera sensor, such as an onboard camera of the EV 102, or a camera of the mobile terminal 120, and the image is in high quality and with recognizable labels or similar markings, the image of the charging pad may be used for display. The processor 502 may also first enhance the image of the charging pad, such as highlighting the outer boundary of the charging pad, and/or highlighting the mark/label on the charging pad. The processor 502 may also add the mark/label on the charging pad in the image if no recognizable marking is on the charging pad. Further, when the image of the charging pad is in poor quality and/or no recognizable marking is on the charging pad, the processor 502 may generate an image of the charging pad (e.g., as shown in FIG. 7B for a charging pad group) with a proper mark/label on the charging pad. Finally, the server 104 may also enhance an existing image of the charging pad or generate a new image of the charging pad, and the processor 502 may obtain the image of the charging pad from the server 104 before display.

Returning to FIG. 8, after displaying the overlayed virtual charge receiving pad and the charging pad, the processor 502 may determine whether it is desired to charge (S808). That is, the processor 502 may determine whether a charging session can be performed based on the positions of the charge receiving pad of the EV 102 and the charge transmitting pad of the charging station 110, because wireless charging can only be performed when the charge receiving pad of the EV 102 and the charge transmitting pad of the charging station 110 are substantially aligned. For example, the processor 502 may determine whether the distance between the charge receiving pad and the charge transmitting pad is below a pre-determined distance threshold, and/or whether the overlapped area between the charge receiving pad and the charge transmitting pad is above a pre-determined area threshold. In other words, the processor 502 may determine whether the charging session can be started based on at least a distance between the charge receiving pad and the charge transmitting pad, and a degree of overlapping between the charge receiving pad and the charge transmitting pad. Other criteria may also be used.

When the processor 502 determines that it is desired to charge (S808; Yes), the processor 502 may prompt the readiness to charge (S812). For example, the processor 502 may use a voice prompt or a text prompt to indicate that a wireless charging session can be performed. In one embodiment, the processor 502 may highlight certain parts of the display to indicate that it is ok to start charging, as well as to indicate which charging pad(s) to be used for charging. FIGS. 10A-10D illustrate certain prompting displays consistent with the disclosed embodiments.

As shown in FIG. 10A, the charging pad 802 is entirely highlighted to indicate that the charging pad 802 is ready to be used for wireless charging. As shown in FIG. 10B, only the overlapped portion of the charge receiving pad 416 and the charging pad 802 is highlighted to indicate that the charging pad 802 is ready for wireless charging and, also, the actual area used for charging. The user may decide to again align the charge receiving pad 416 and the charging pad 802 to have a larger overlapped area for fast and efficient charging.

As shown in FIG. 10C, a charging pad group is used as the charge transmitting pad, and charging pad 1 and charging pad 3 can be used for charging, while charging pad 2 and charging pad 4 cannot be used for charging. Both the charging pad 1 and charging pad 3 are entirely highlighted to indicate that the charging pad 1 and charging pad 3 are ready to be used for wireless charging. As shown in FIG. 10D, only the overlapped portion of the charge receiving pad 416 and the charging pad group is highlighted (i.e., the entire charging pad 1 and portion of the charging pad 3) to indicate that the charging pad 1 and charging pad 3 are ready for wireless charging and, also, the actual areas can be used for charging.

Returning to FIG. 8, when the processor 502 determines that it is not desired to charge (S808; No), the processor 502 may adjust the spatial relationship between the charge receiving pad of the EV 102 and the charging pad of the charging station 110 (S810). That is, after the processor 502 determines that the current spatial alignment between the charge receiving pad of the EV 102 and the charging pad of the charging station 110 is not desired to start wireless charging, the processor 502 may adjust the current spatial alignment to be desired for wireless charging. For example, the processor 502 may adjust the location, distance, and/or orientation of the charge receiving pad of the EV 102 with respect to the charging pad of the charging station 110, such that a wireless charging session can be initiated. The processor 502 may control the charge receiving pad or vehicle charging system 214 of the EV 102 to move according to the location, distance, and/or orientation. Alternatively or additionally, the processor 502 may also control the EV 102 to move so as to adjust the location, distance, and/or orientation of the charge receiving pad of the EV 102. The wireless charging process may then continue from S802 to update the spatial relationship and the display.

In addition, the processor 502 may enable the user to manually adjust the spatial relationship between the charge receiving pad of the EV 102 and the charging pad of the charging station 110. For example, the processor 502 may prompt the user on the display screen that the user may choose to adjust the spatial relationship manually and may detect a dragging operation on the virtual charge receiving pad by the user. The dragging operation may move the virtual charge receiving pad on the display to a different location and/or orientation. Based on the dragging operation, the processor 502 may cause the EV 102 to move the charge receiving pad accordingly. That is, the user may drag the virtual charge receiving pad to a new location and/or orientation to control the movement of the actual charge receiving pad to move to the new location and/or orientation with respect to the charging pad of the charging station 110.

Although the above description is for the user to manually adjust the spatial relationship in S810, the user may adjust the spatial relationship at any time, e.g., even after the processor 502 determines that it is desired to charge. That is, the processor 502 may detect the dragging operation on the virtual charge receiving pad by the user and, after user's manual input, the processor 502 may control the movement of the actual charge receiving pad, and may update the spatial relationship and display accordingly.

Figure 11:
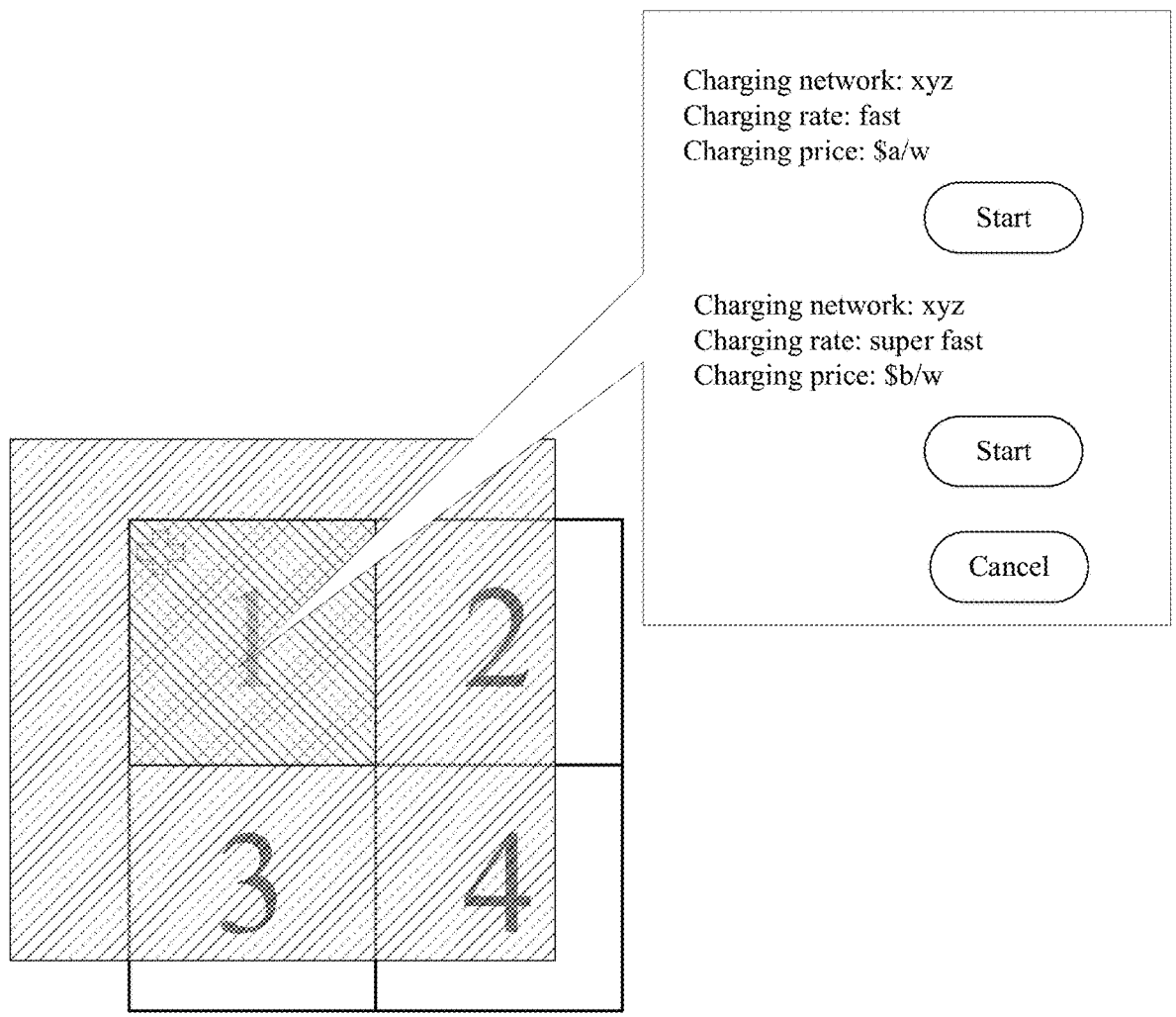
FIG. 11 illustrates an exemplary selection configuration consistent with the disclosed embodiments.

Returning to FIG. 6, after the charging position is established, the processor 502 may select a charging scheme (S606). The processor 502 may select a charging scheme based on pre-stored criteria or may select a charging scheme based on a user input. FIG. 11 illustrates an exemplary selection configuration consistent with the disclosed embodiments.

As shown in FIG. 11, the user may click on a highlighted portion to display one or more charging schemes to be selected and initiated. That it, the processor 502 may determine that the user clicks on the highlighted charging pad 1, and may display a charging scheme or a list of charging schemes associated the charging pad 1. After the user clicks on a "Start" button, the processor 502 may determine that the user selects the corresponding charging scheme and may start a charging process (S608). To start the charging process, the processor 502 may also establish a communication session with the server 104 for authorization and authentication of the user and/or the EV 102, as well as for payment processing, etc. For example, the processor 502 may start a transaction session with the server 104 for the wireless charging session.

Figure 12:
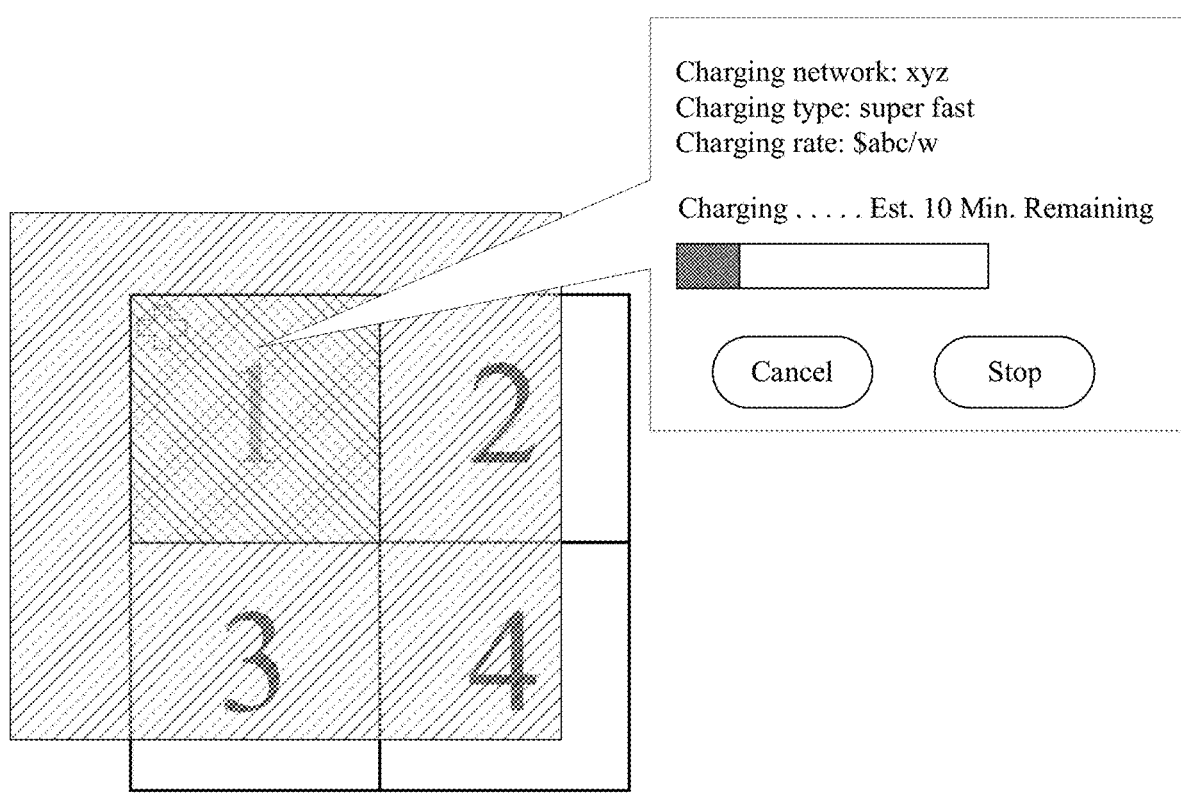
FIG. 12 illustrates an exemplary display of wireless charging status and result consistent with the disclosed embodiments.

Further, the processor may also display the wireless charging status and results (S610). As shown in FIG. 12, when the wireless charging based on charging pad 1 is started, the status of the wireless charging session "Charging . . . Est. 10 Min Remaining" is displayed to indicate the start of charging, and estimated time remaining until fully charged. Further, a status bar may also be displayed to picturize the charging status. In addition, the user may stop/restart the wireless charging session using the "Stop" button, or may cancel the wireless charging session using the "Cancel" button.

Figure 13:
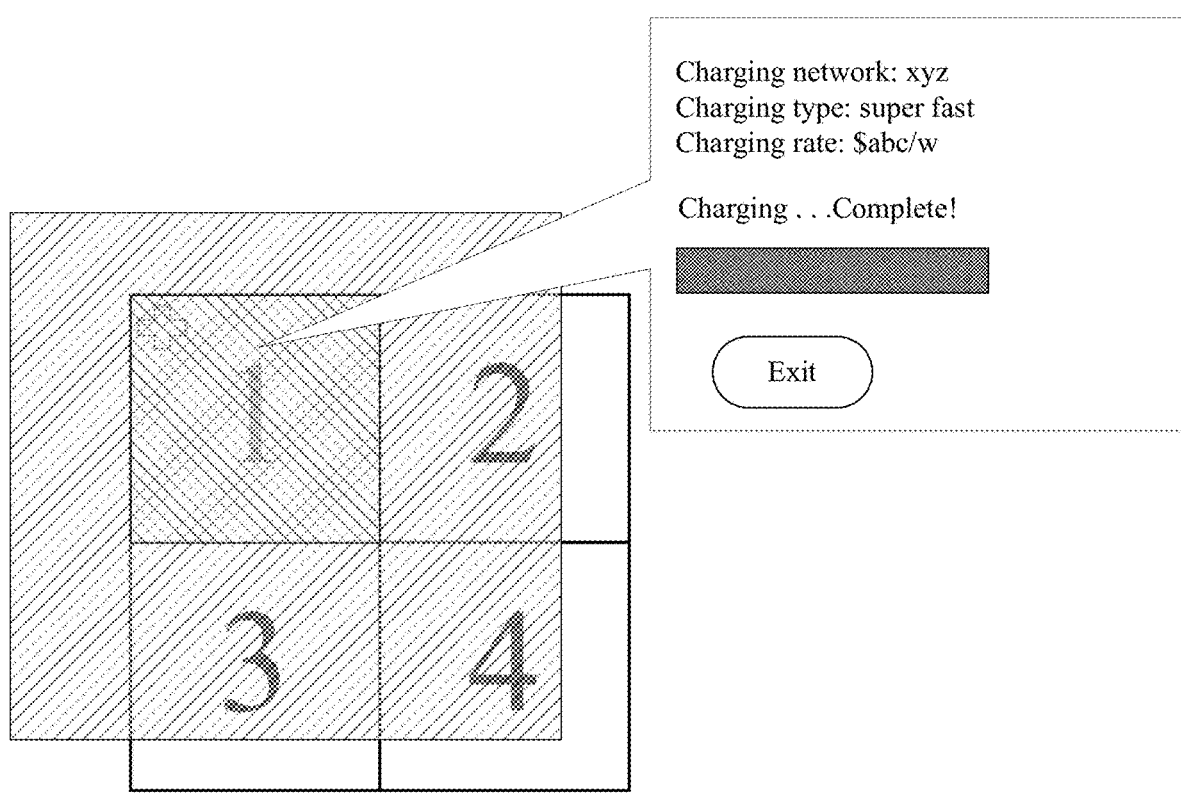
FIG. 13 illustrates another exemplary display of wireless charging status and result consistent with the disclosed embodiments.

Further, as shown in FIG. 13, the status of the wireless charging session "Charging . . . Complete" is displayed to indicate the completion of charging. Further, a status bar may also be displayed to picturize the charging completion. The user may exit the wireless charging session using the "Exit" button.

Further, the processor 502 may complete the charging process (S612). That is, the processor 502 complete all remaining tasks to complete the wireless charging process on the EV 102. For example, the processor 502 may complete the transaction session with the server 104 to complete the charging transaction including payment processing. The processor 502 may also control the vehicle charging system 214 to move the charge receiving pad back to its original position, and may also turn off the vehicle charging system 214. At the same time, the server 104 and the charging station 110 may also complete relevant tasks of the wireless charging process. Other actions may also be performed.

By using the disclosed methods and systems, an improved wireless charging process may be performed using state-of-the-art technologies. Accordingly, the wireless charging for electric vehicles can be more efficient, more reliable, and more convenient to use.

What is claimed is:

1. A method for wirelessly charging an electric vehicle, comprising:
obtaining charging information about a wireless charging station, the wireless charging station including a charging pad group having multiple charging pads for coupling with and wirelessly transmitting power to at least one charge receiving pad of the electric vehicle, wherein the charging information includes at least a charging rate and charging price and is different among the multiple charging pads;
establishing a charging position between at least one charging pad from the charging pad group of the wireless charging station and the at least one charge receiving pad of the electric vehicle;
displaying on a display screen the at least one charging pad overlapped by a virtual charge receiving pad representing the at least one charge receiving pad of the electric vehicle;
determining whether the charging position is desired to start a wireless charging session between the charging station and the electric vehicle;
after determining that the charging position is desired to start the wireless charging session, prompting a readiness for charging on the display screen; and
starting the wireless charging session between the electric vehicle and the wireless charging station.

2. The method according to claim 1, further comprising:
after determining that the charging position is not desired to start the wireless charging session, adjusting the charging position between the at least one charging pad of the wireless charging station and the at least one charge receiving pad of the electric vehicle by causing a movement of the at least one charge receiving pad with respect to the at least one charging pad.

3. The method according to claim 1, further comprising:
displaying the charging information to a user of the vehicle to indicate different charging rates and charging prices of the multiple charging pads of the charging pad group;
detecting a dragging operation on the virtual charge receiving pad by the user on the display screen; and
based on the dragging operation, adjusting the charging position between the at least one charging pad of the wireless charging station and the at least one charge receiving pad of the electric vehicle by causing a movement of the at least one charge receiving pad, corresponding to the dragging operation, with respect to the at least one charging pad.

4. The method according to claim 1, wherein the determining whether the charging position is desired to start a wireless charging session further includes:
determining whether the charging position is desired to start the wireless charging session based on a distance between the at least one charge receiving pad and the at least one charging pad, and a degree of overlapping between the at least one charge receiving pad and the at least one charging pad.

5. The method according to claim 1, wherein the prompting a readiness for charging on the display screen further include:
prompting the readiness for charging on the display screen by highlighting a charging pad that is substantially overlapped with the virtual charge receiving pad to indicate that the highlighted charging pad is ready to be used for charging.

6. The method according to claim 1, wherein the prompting a readiness for charging on the display screen further include:
prompting the readiness for charging on the display screen by highlighting a portion of a charging pad that is overlapped between the charging pad and the virtual charge receiving pad to indicate that the charging pad with the highlighted portion is ready to be used for charging.

7. The method according to claim 1, wherein the displaying on a display screen the at least one charging pad overlapped by a virtual charge receiving pad further includes:
obtaining an image of the at least one charging pad;
enhancing the image of the at least one charging pad by adding at least one of a highlighted boundary of the at least one charging pad, a positioning marking on the at least one charging pad, and a color of the at least one charging pad; and
overlaying the virtual charge receiving pad over the enhanced image of the at least one charging pad.

8. The method according to claim 1, wherein the at least one charge receiving pad of the electric vehicle includes a plurality of charge receiving pads arranged in an array.

9. An electronic device, comprising:
a camera;
a non-transitory memory storing computer program instructions; and
a processor coupled to the non-transitory memory and, when executing the computer program instructions, configured to perform:

obtaining charging information about a wireless charging station, the wireless charging station including a charging pad group having multiple charging pads for coupling with and wirelessly transmitting power to at least one charge receiving pad of the electric vehicle, wherein the charging information includes at least a charging rate and charging price and is different among the multiple charging pads;

establishing a charging position between at least one charging pad from the charging pad group of the wireless charging station and the at least one charge receiving pad of the electric vehicle;

displaying on a display screen the at least one charging pad overlapped by a virtual charge receiving pad representing the at least one charge receiving pad of the electric vehicle;

determining whether the charging position is desired to start a wireless charging session between the charging station and the electric vehicle;

after determining that the charging position is desired to start the wireless charging session, prompting a readiness for charging on the display screen; and starting the wireless charging session between the electric vehicle and the wireless charging station.

10. The electronic device according to claim 9, wherein the processor is further configured to perform:

after determining that the charging position is not desired to start the wireless charging session, adjusting the charging position between the at least one charging pad of the wireless charging station and the at least one charge receiving pad of the electric vehicle by causing a movement of the at least one charge receiving pad with respect to the at least one charging pad.

11. The electronic device according to claim 9, wherein the processor is further configured to perform:

displaying the charging information to a user of the vehicle to indicate different charging rates and charging prices of the multiple charging pads of the charging pad group;

detecting a dragging operation on the virtual charge receiving pad by the user on the display screen; and based on the dragging operation, adjusting the charging position between the at least one charging pad of the wireless charging station and the at least one charge receiving pad of the electric vehicle by causing a movement of the at least one charge receiving pad, corresponding to the dragging operation, with respect to the at least one charging pad.

12. The electronic device according to claim 9, wherein the determining whether the charging position is desired to start a wireless charging session further includes:

determining whether the charging position is desired to start the wireless charging session based on a distance between the at least one charge receiving pad and the at least one charging pad, and a degree of overlapping between the at least one charge receiving pad and the at least one charging pad.

13. The electronic device according to claim 9, wherein the prompting a readiness for charging on the display screen further include:

prompting the readiness for charging on the display screen by highlighting a charging pad that is substantially overlapped with the virtual charge receiving pad to indicate that the highlighted charging pad is ready to be used for charging; or prompting the readiness for charging on the display screen by highlighting a portion of a charging pad that is overlapped between the charging pad and the virtual charge receiving pad to indicate that the charging pad with the highlighted portion is ready to be used for charging.

14. The electronic device according to claim 9, wherein the displaying on a display screen the at least one charging pad overlapped by a virtual charge receiving pad further includes:

obtaining an image of the at least one charging pad using the camera;

enhancing the image of the at least one charging pad by adding at least one of a highlighted boundary of the at least one charging pad, a positioning mark on the at least one charging pad, and a color of the at least one charging pad; and overlaying the virtual charge receiving pad over the enhanced image of the at least one charging pad.

15. An electric vehicle, comprising:

a vehicle body;

a motor housed by the vehicle body;

a battery for providing power to the motor;

a vehicle charging system for wireless charging the battery from a wireless charging station and including at least one charge receiving pad;

a display screen; and a controller to control the vehicle charging system to perform:

obtaining charging information about a wireless charging station, the wireless charging station including a charging pad group having multiple charging pads for coupling with and wirelessly transmitting power to at least one charge receiving pad of the electric vehicle, wherein the charging information includes at least a charging rate and charging price and is different among the multiple charging pads;

establishing a charging position between at least one charging pad from the charging pad group of the wireless charging station and the at least one charge receiving pad of the electric vehicle;

displaying on the display screen the at least one charging pad overlapped by a virtual charge receiving pad representing the at least one charge receiving pad of the electric vehicle;

determining whether the charging position is desired to start a wireless charging session between the charging station and the electric vehicle;

after determining that the charging position is desired to start the wireless charging session, prompting a readiness for charging on the display screen; and starting the wireless charging session between the electric vehicle and the wireless charging station.

16. The electric vehicle according to claim 15, wherein the controller further performs:

after determining that the charging position is not desired to start the wireless charging session, adjusting the charging position between the at least one charging pad of the wireless charging station and the at least one charge receiving pad by causing a movement of the at least one charge receiving pad with respect to the at least one charging pad.

17. The electric vehicle according to claim 15, wherein the controller further performs:

displaying the charging information to a user of the vehicle to indicate different charging rates and charging prices of the multiple charging pads of the charging pad group;

detecting a dragging operation on the virtual charge receiving pad by the user on the display screen; and based on the dragging operation, adjusting the charging position between the at least one charging pad of the wireless charging station and the at least one charge receiving pad by causing a movement of the at least one charge receiving pad, corresponding to the dragging operation, with respect to the at least one charging pad.

18. The electric vehicle according to claim 15, wherein the determining whether the charging position is desired to start a wireless charging session further includes:

determining whether the charging position is desired to start the wireless charging session based on a distance between the at least one charge receiving pad and the at least one charging pad, and a degree of overlapping between the at least one charge receiving pad and the at least one charging pad.

19. The electric vehicle according to claim 15, wherein the prompting a readiness for charging on the display screen further include:

prompting the readiness for charging on the display screen by highlighting a charging pad that is substantially overlapped with the virtual charge receiving pad to indicate that the highlighted charging pad is ready to be used for charging; or prompting the readiness for charging on the display screen by highlighting a portion of a charging pad that is overlapped between the charging pad and the virtual charge receiving pad to indicate that the charging pad with the highlighted portion is ready to be used for charging.

20. The electric vehicle according to claim 15, wherein the displaying on a display screen the at least one charging pad overlapped by a virtual charge receiving pad further includes:

obtaining an image of the at least one charging pad;

enhancing the image of the at least one charging pad by adding at least one of a highlighted boundary of the at least one charging pad, a positioning mark on the at least one charging pad, and a color of the at least one charging pad; and overlaying the virtual charge receiving pad over the enhanced image of the at least one charging pad.

* * * * *